(12) United States Patent  (10) Patent No.: US 12,065,534 B2
Komatsu et al.  (45) Date of Patent: Aug. 20, 2024

(54) COMPOSITION, METHOD OF PRODUCING SUBSTRATE, AND POLYMER

(71) Applicant: JSR CORPORATION, Tokyo (JP)

(72) Inventors: Hiroyuki Komatsu, Tokyo (JP); Motohiro Shiratani, Tokyo (JP); Tatsuya Sakai, Tokyo (JP)

(73) Assignee: JSR CORPORATION, Tokyo (JP)

( * ) Notice: Subject to any disclaimer, the term of this patent is extended or adjusted under 35 U.S.C. 154(b) by 272 days.

(21) Appl. No.: 17/541,317

(22) Filed: Dec. 3, 2021

(65) Prior Publication Data

US 2022/0089809 A1  Mar. 24, 2022

Related U.S. Application Data

(63) Continuation of application No. PCT/JP2020/021991, filed on Jun. 3, 2020.

(30) Foreign Application Priority Data

Jun. 10, 2019  (JP) .............................. 2019-108156

(51) Int. Cl.
  *C08G 61/02*  (2006.01)
  *B05D 3/02*  (2006.01)
  *C09D 165/00*  (2006.01)

(52) U.S. Cl.
  CPC ........... *C08G 61/02* (2013.01); *B05D 3/0254* (2013.01); *C09D 165/00* (2013.01)

(58) Field of Classification Search
  CPC ..... C08G 61/02; B05D 3/0254; C09D 165/00
  See application file for complete search history.

(56) References Cited

U.S. PATENT DOCUMENTS

| | | | |
|---|---|---|---|
| 2012/0231634 A1* | 9/2012 | Min ................... | H01L 21/02126 |
| | | | 257/E21.259 |
| 2012/0289663 A1* | 11/2012 | Mullins ............. | C07F 9/657172 |
| | | | 558/76 |
| 2014/0378627 A1* | 12/2014 | Hefner, Jr. ......... | C08G 73/0655 |
| | | | 525/521 |

FOREIGN PATENT DOCUMENTS

| | | |
|---|---|---|
| JP | 2003076036 A | 3/2003 |
| JP | 2006257329 A | 9/2006 |
| JP | 2009148685 A | 7/2009 |
| JP | 2016025355 A | 2/2016 |

OTHER PUBLICATIONS

Sato et al. (Synthetic Metals 161 (2011) 1289-1298).*
Office Action issued Nov. 7, 2023 in Japanese Patent Application No. 2021-526043 (with English machine translation), 11 pages.
(Continued)

*Primary Examiner* — Shane Fang
(74) *Attorney, Agent, or Firm* — Element IP, PLC

(57) ABSTRACT

A composition includes a polymer and a solvent. The polymer includes: a structural unit including a ring structure; and a functional group capable of bonding to a metal atom. An atom chain constituting the ring structure constitutes a part of a main chain of the polymer. The polymer preferably includes at an end of the main chain or at an end of a side chain, a group including the functional group. The functional group is preferably a cyano group, a phosphono group, or a dihydroxyboryl group. The ring structure preferably includes an alicyclic structure.

20 Claims, 1 Drawing Sheet

Selective brush on Metal

Baking: 150 °C, 3 min
Rinsing: PGMEA

(56) References Cited

OTHER PUBLICATIONS

Atsushi Hozumi et al, "Preparation of a Well-Defined Amino-Terminated Self-Assembled Monolayer and Copper Microlines on a Polyimide Substrate Covered with an Oxide Nanoskin", Langmuir, 21, 2005, pp. 8234-8242.
Fatemeh Sadat Minaye Hashemi et al, "Self-Correcting Process for High Quality Patterning by Atomic Layer Deposition", ACS Nano, vol. 9, No. 9, 2015, pp. 8710-8717.
Haeshin Lee et al, "Mussel-Inspired Surface Chemistry for Multi-functional Coatings", Science, 318(5849), Oct. 19, 2007, 10 pages.
International Search Report issued Aug. 25, 2020 in PCT/JP2020/021991 (with English translation), 5 pages.
Ming Fang et al, "Area-Selective Atomic Layer Deposition: Conformal Coating, Subnanometer Thickness Control, and Smart Positioning", ACS Nano, vol. 9, No. 9, 2015, pp. 8651-8654.
Written Opinion issued Aug. 25, 2020 in PCT/JP2020/021991 (with English translation), 8 pages.

\* cited by examiner

Baking: 150 ° C, 3 min
Rinsing: PGMEA

COMPOSITION, METHOD OF PRODUCING SUBSTRATE, AND POLYMER

CROSS-REFERENCE TO RELATED APPLICATIONS

The present application is a continuation application of International Application No. PCT/JP2020/021991, filed Jun. 3, 2020, which claims priority to Japanese Patent Application No. 2019-108156 filed Jun. 10, 2019. The contents of these applications are incorporated herein by reference in their entirety.

BACKGROUND OF THE INVENTION

Field of the Invention

The present invention relates to a composition, a method of producing a substrate, and a polymer.

Discussion of the Background

Further microfabrication of semiconductor devices has been accompanied by a demand for a technique of forming a fine pattern having a line width of less than 30 nm. However, optical factors and the like have led to technical difficulties for conventional methods employing lithography.

Therefore, a bottom-up technique, as generally referred to, has been contemplated for forming a fine pattern. As the bottom-up technique, in addition to a method employing directed self-assembly of a polymer, a method for selectively modifying a base having a surface layer that includes fine regions has been recently studied. Such a method for selective modification requires a material enabling convenient and highly selective modification of surface regions, and various materials have been investigated for such use (see Japanese Unexamined Patent Application, Publication No. 2016-25355; Japanese Unexamined Patent Application, Publication No. 2003-76036; ACS Nano, 9, 9, 8710, 2015; ACS Nano, 9, 9, 8651, 2015; Science, 318, 426, 2007; and Langmuir, 21, 8234, 2005).

SUMMARY OF THE INVENTION

According to an aspect of the present invention, a composition includes a polymer and a solvent. The polymer includes: a structural unit including a ring structure; and a functional group capable of bonding to a metal atom. An atom chain constituting the ring structure constitutes a part of a main chain of the polymer.

According to another aspect of the present invention, a method of producing a substrate includes forming a coating film directly or indirectly on a base including a metal atom in a surface layer thereof by applying a composition. The coating film is heated. The composition includes a polymer and a solvent. The polymer includes: a structural unit including a ring structure; and a functional group capable of bonding to the metal atom. An atom chain constituting the ring structure constitutes a part of a main chain of the polymer.

According to a further aspect of the present invention, a polymer includes a structural unit including a ring structure. An atom chain constituting the ring structure constitutes a part of a main chain of the polymer. The polymer includes at an end of the main chain or at an end of a side chain, a cyano group, a phosphono group, or a dihydroxyboryl group.

DESCRIPTION OF EMBODIMENTS

Figure 1:
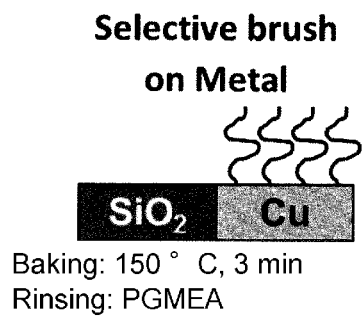
FIG. 1 is a schematic view illustrating regionally selective chemical modification of a surface of a base containing a metal atom in a surface layer thereof, by using the composition of one embodiment of the present invention.

Recently, surfaces of bases are subjected to pattern deposition through metal oxide formation using an ALD (Atomic Layer Deposition) process or a CVD (Chemical Vapor Deposition) process, and thus the deposition of the pattern in a highly selective manner with discrimination of the regions has been required. On the other hand, there is also a requirement to enable removing by wet detachment, chemical modification which had been performed on the surface of a base, in a convenient manner with influences on the base being diminished.

According to one embodiment of the invention, a composition is to be used for chemical modification of a surface of a base (hereinafter, may be also referred to as "base (S)") containing a metal atom (hereinafter, may be also referred to as "metal atom (M)") in a surface layer thereof, the composition containing: a polymer (hereinafter, may be also referred to as "(A) polymer" or "polymer (A)") having a structural unit (hereinafter, may be also referred to as "structural unit (I)") which includes a ring structure, and a functional group (hereinafter, may be also referred to as "functional group (X)") capable of bonding to the metal atom (M); and a solvent (hereinafter, may be also referred to as "(B) solvent" or "solvent (B)"), wherein an atom chain constituting the ring structure constitutes a part of a main chain of the polymer.

According to another embodiment of the present, a method of producing a substrate includes: applying the composition of the one embodiment of the invention directly or indirectly on a base (S) containing a metal atom (M) in a surface layer thereof; and heating a coating film formed by the applying.

According to still another embodiment of the present invention, a polymer has a structural unit (structural unit (I)) which includes a ring structure, wherein an atom chain constituting the ring structure constitutes a part of a main chain of the polymer, and the polymer has at an end of the main chain or at an end of a side chain, a cyano group, a phosphono group or a dihydroxyboryl group (hereinafter, may be also referred to as "functional group (X')").

The composition and the method of producing a substrate according to the embodiments of the present invention enable regionally selective forming, on a surface of a base containing a metal atom in a surface layer thereof, a film which is superior in heat resistance and is wet detachable, the film being capable of implementing superior blocking performance against metal oxide formation by an ALD process or a CVD process. The polymer according to the still another embodiment of the present invention can be suitably used as a polymer component of the composition of the one embodiment of the present invention. Therefore, the composition, the method of producing a substrate, and the polymer of the embodiments of the present invention can be suitably used for working processes of semiconductor devices, and the like, in which microfabrication is expected to be further in progress hereafter. Hereinafter, the embodiments of the present invention will be explained in detail.

Composition

The composition is to be used in chemical modification of a surface of a base (S) containing a metal atom in a surface layer thereof. The composition contains the polymer (A) and the solvent (B). The composition may contain optional component(s) within a range not leading to impairment of the effects of the present invention.

Figure 2:
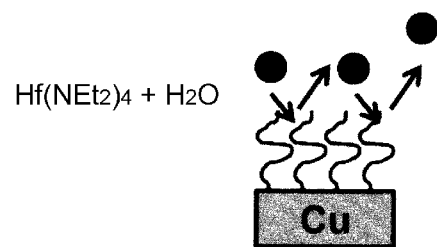
FIG. 2 is a schematic view illustrating blocking performance against metal oxide formation by an ALD process.

Due to containing the polymer (A) and the solvent (B), and to the polymer (A) having the structural unit (I) and the functional group (X), the composition enables regionally selective forming of a film which is superior in heat resistance and is wet detachable on the surface of the base (S) containing the metal atom (M) in the surface layer thereof, and the film is capable of achieving superior blocking performance against metal oxide formation by an ALD process or a CVD process. Although not necessarily clarified and without wishing to be bound by any theory, the reason for achieving the aforementioned effects by the composition due to involving such a constitution may be presumed, for example, as in the following. The polymer (A) provides superior heat resistance since the atom chain constituting the ring structure constitutes a part of the main chain of the polymer in the structural unit (I). Also, due to the polymer (A) having the functional group (X) which is capable of bonding to the metal atom (M), it is possible to form a chemically modified film in a regionally selective manner on the surface of the base (S) containing the metal atom (M) in the surface layer thereof, as shown in FIG. 1, and this film is wet detachable by using an acid-containing liquid or the like. Furthermore, as shown in FIG. 2, by using such a film being superior in heat resistance, blocking performance against metal oxide formation by an ALD process or a CVD process can be further improved.

Hereinafter, the base (S), and each component of the composition will be described.

Base

The base (S) contains the metal atom (M) in the surface layer thereof.

The metal atom (M) is not particularly limited as long as it is an atom of a metal element. It is to be noted that silicon is a nonmetal and does not fall under the category of the metal atom. Examples of the metal atom (M) include atoms of copper, iron, zinc, cobalt, aluminum, tin, tungsten, zirconium, titanium, tantalum, germanium, molybdenum, ruthenium, gold, silver, platinum, palladium, nickel, and the like. Of these, copper, cobalt, or tungsten is preferred.

The metal atom (M) in the surface layer may be included in the form of, for example, a metal simple substance, an alloy, an electrically conductive nitride, a metal oxide, a silicide, or the like.

Examples of the metal simple substance include simple substances of metals such as copper, iron, cobalt, tungsten, tantalum, and the like.

Examples of the alloy include a nickel-copper alloy, a cobalt-nickel alloy, a gold-silver alloy, and the like.

Examples of the electric conductive nitride include tantalum nitride, titanium nitride, iron nitride, aluminum nitride, and the like.

Examples of the metal oxide include tantalum oxide, aluminum oxide, iron oxide, copper oxide, and the like.

Examples of the silicide include iron silicide, molybdenum silicide, and the like.

Of these, the metal simple substance, the alloy, the electrically conductive nitride, or the silicide is preferred, the metal simple substance or the electrically conductive nitride is more preferred, a copper simple substance, a cobalt simple substance, a tungsten simple substance, a tantalum simple substance, titanium nitride, or a tantalum nitride is still more preferred, and a copper simple substance, a cobalt simple substance, or a tungsten simple substance is particularly preferred.

The base (S) preferably has: a region (hereinafter, may be also referred to as "region (I)") containing the metal atom (M) in the surface layer thereof; and a region (hereinafter, may be also referred to as "region (II)") not containing the metal atom (M) in the surface layer thereof. It is preferred that the region (II) substantially consists of only a nonmetal atom (hereinafter, may be also referred to as "nonmetal atom (N)").

In the region (II), the nonmetal atom (N) may be included in the form of, for example, a nonmetal simple substance, a nonmetal oxide, a nonmetal nitride, a nonmetal oxidenitride, and the like.

Examples of the nonmetal simple substance include simple substances of silicon, carbon, etc., and the like.

Examples of the nonmetal oxide include silicon oxide and the like.

Examples of the nonmetal nitride include $SiN_x$, $Si_3N_4$, and the like.

Examples of the nonmetal oxidenitride include SiON and the like.

Of these, the nonmetal oxide is preferred, and silicon oxide is more preferred.

A mode of the arrangement of the region (I) and the region (II) on the base (S) is not particularly limited, and is exemplified by surficial, spotted, striped, and other shapes in a planar view. The sizes of the region (I) and the region (II) are not particularly limited, and regions having a desired size may be provided as appropriate.

The shape of the base (X) is not particularly limited, and the base (X) may be made into a desired shape such as a plate shape (substrate) or a spherical shape as appropriate.

(A) Polymer

The polymer (A) is a polymer having the structural unit (I), and thus having the functional group (X). The polymer (A) may also have a structural unit (hereinafter, may be also referred to as "structural unit (II)") other than the structural unit (I).

Each structural unit will be described below.

Structural Unit (I)

The structural unit (I) is a structural unit which includes a ring structure, and an atom chain constituting the ring structure constitutes a part of the main chain of the polymer (A). In other words, the structural unit (I) is a structural unit which includes a ring structure in the main chain thereof. The "main chain" as referred to herein means a longest atom chain among atom chains constituting the polymer.

The ring structure included in the structural unit (I) is exemplified by an alicyclic structure, an aromatic ring structure, an aliphatic heterocyclic structure, an aromatic heterocyclic structure, and combinations of these ring structures.

Examples of the alicyclic structure include:
monocyclic alicyclic structures having 3 to 20 ring atoms such as a cyclopropane structure, a cyclobutane structure, a cyclopentane structure, a cyclohexane structure, a cycloheptane structure, a cyclooctane structure, and a cyclodecane structure;
polycyclic alicyclic structures having 7 to 20 ring atoms such as a norbornane structure, an adamantane structure, a tricyclodecane structure, a tetracyclododecane structure, and a decahydronaphthalene structure; and the like.

Examples of the aromatic ring structure include aromatic ring structures having 6 to 20 ring atoms such as a benzene structure, a naphthalene structure, an anthracene structure, a phenanthrene structure, a tetracene structure, and a pyrene structure, and the like.

Examples of the aliphatic heterocyclic structure include aliphatic heterocyclic structures having 5 to 20 ring atoms such as a tetrahydrofuran structure, a tetrahydropyran structure, a pyrrolidine structure, a piperidine structure, a piperazine structure, a morpholine structure, a tetrahydrothiophene structure, a chromane structure, and an indoline structure, and the like.

Examples of the aromatic heterocyclic structure include a furan structure, a pyran structure, a pyrrole structure, a pyridine structure, a pyrazine structure, a pyrimidine structure, a thiophene structure, a quinoline structure, and the like.

It is preferred that the ring structure includes the alicyclic structure.

As the ring structure, a polycyclic structure which includes the alicyclic structure and the aromatic ring structure is more preferred. In other words, the polycyclic structure provided by fusion of the alicyclic structure with the aromatic ring structure is more preferred as the ring structure. Such a polycyclic structure is exemplified by a tetrahydronaphthalene structure and the like. In the case of such a polycyclic structure, an atom chain constituting the alicyclic structure preferably constitutes a part of the main chain of the polymer.

The structural unit (I) is exemplified by a structural unit (hereinafter, may be also referred to as "structural unit (I-1)") represented by the following formula (1), and the like. As represented by the following formula (1), the structural unit (I-1) includes as the ring structure, a polycyclic structure provided by fusion of the cyclohexane structure with the benzene structure, and the atom chain constituting the cyclohexane structure constitutes a part of the main chain.

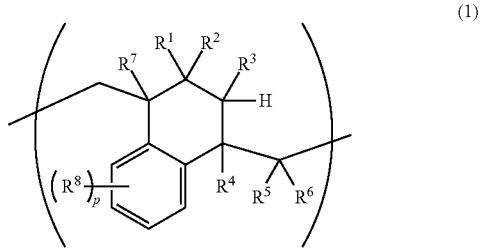

(1)

In the above formula (1), $R^1$ to $R^6$ each independently represent a hydrogen atom, a halogen atom, or a monovalent organic group having 1 to 10 carbon atoms; $R^7$ represents a hydrogen atom or a monovalent organic group having 1 to 10 carbon atoms; and p is an integer of 0 to 4, wherein in a case in which p is 1, $R^8$ represents a halogen atom, a hydroxy group, or a monovalent organic group having 1 to 20 carbon atoms, and wherein in a case in which p is no less than 2, a plurality of $R^8$s are identical or different from each other and each represent a halogen atom, a hydroxy group, or a monovalent organic group having 1 to 20 carbon atoms, or at least two of the plurality of $R^8$s taken together represent a ring structure having 4 to 20 ring atoms together with the carbon chain to which the at least two of the plurality of $R^8$s bond.

Examples of the monovalent organic group having 1 to 10 carbon atoms which may be represented by $R^1$ to $R^6$ or $R^7$ include alkyl groups having 1 to 10 carbon atoms such as a methyl group and an ethyl group, and the like.

$R^1$ to $R^6$ and $R^7$ each represent preferably a hydrogen atom or the alkyl group, and more preferably a hydrogen atom or a methyl group.

The monovalent organic group having 1 to 20 carbon atoms which may be represented by $R^8$ is exemplified by: a monovalent hydrocarbon group having 1 to 20 carbon atoms; a monovalent group (α) that includes a divalent hetero atom-containing group between two adjacent carbon atoms of the monovalent hydrocarbon group having 1 to 20 carbon atoms; a monovalent group (β) obtained by substituting with a monovalent hetero atom-containing group, a part or all of hydrogen atoms included in the monovalent hydrocarbon group having 1 to 20 carbon atoms and the monovalent group (α); a monovalent group (γ) obtained by combining a divalent hetero atom-containing group with the monovalent hydrocarbon group having 1 to 20 carbon atoms, the monovalent group (α), or the monovalent group (β); and the like. It is to be noted that in the case in which the hetero atom-containing group has carbon atom(s), the number of the carbon atom(s) is also included in the 1 to 20 carbon atoms of the organic group.

The monovalent hydrocarbon group having 1 to 20 carbon atoms is exemplified by a monovalent chain hydrocarbon group having 1 to 20 carbon atoms, a monovalent alicyclic hydrocarbon group having 3 to 20 carbon atoms, a monovalent aromatic hydrocarbon group having 6 to 20 carbon atoms, and the like.

The "hydrocarbon group" as referred to herein may be exemplified by a chain hydrocarbon group, an alicyclic hydrocarbon group, and an aromatic hydrocarbon group. The "hydrocarbon group" may be either a saturated hydrocarbon group or an unsaturated hydrocarbon group. The "chain hydrocarbon group" as referred to herein means a hydrocarbon group not including a cyclic structure but being constituted with only a chain structure, and may be exemplified by both a linear hydrocarbon group and a branched hydrocarbon group. The "alicyclic hydrocarbon group" as referred to herein means a hydrocarbon group that includes, as a ring structure, not an aromatic ring structure but an alicyclic structure alone, and may be exemplified by both a monocyclic alicyclic hydrocarbon group and a polycyclic alicyclic hydrocarbon group. With regard to this, it is not necessary for the alicyclic hydrocarbon group to be constituted with only an alicyclic structure; it may include a chain structure in a part thereof. The "aromatic hydrocarbon group" as referred to herein means a hydrocarbon group that includes an aromatic ring structure as a ring structure. With regard to this, it is not necessary for the aromatic hydrocarbon group to be constituted with only an aromatic ring structure, and a part thereof may include a chain structure and/or an alicyclic structure.

Examples of the monovalent chain hydrocarbon group having 1 to 20 carbon atoms include:
  alkyl groups such as a methyl group, an ethyl group, an n-propyl group, an i-propyl group, and a t-butyl group;
  alkenyl groups such as an ethenyl group, a propenyl group, and a butenyl group;
  alkynyl groups such as an ethynyl group, a propynyl group, and a butynyl group; and the like.

Examples of the monovalent alicyclic hydrocarbon group having 3 to 20 carbon atoms include:
  monocyclic alicyclic saturated hydrocarbon groups such as a cyclopentyl group and a cyclohexyl group;

monocyclic alicyclic unsaturated hydrocarbon groups such as a cyclopentenyl group and a cyclohexenyl group;

polycyclic alicyclic saturated hydrocarbon groups such as a norbornyl group, an adamantyl group, and a tricyclodecyl group;

polycyclic alicyclic unsaturated hydrocarbon groups such as a norbornenyl group and a tricyclodecenyl group; and the like.

Examples of the monovalent aromatic hydrocarbon group having 6 to 20 carbon atoms include:

aryl groups such as a phenyl group, a tolyl group, a xylyl group, a naphthyl group, and an anthryl group;

aralkyl groups such as a benzyl group, a phenethyl group, a naphthylmethyl group, and an anthrylmethyl group; and the like.

The hetero atom contained in the monovalent or divalent hetero atom-containing group is exemplified by an oxygen atom, a nitrogen atom, a sulfur atom, a phosphorus atom, a silicon atom, a halogen atom, and the like. Examples of the halogen atom include a fluorine atom, a chlorine atom, a bromine atom, an iodine atom, and the like.

Examples of the divalent hetero atom-containing group include —O—, —CO—, —S—, —CS—, —NR'—, —SO—, —SO$_2$—, a group obtained by combining two or more of these, and the like, wherein R' represents a hydrogen atom or a monovalent hydrocarbon group.

Examples of the monovalent hetero atom-containing group include: halogen atoms such as a fluorine atom, a chlorine atom, a bromine atom, and an iodine atom; a hydroxy group; a carboxy group; a cyano group; an amino group; a sulfanyl group; and the like.

$R^8$ represents preferably the monovalent hydrocarbon group having 1 to 10 carbon atoms, a hydroxy group, or a halogen atom, more preferably the alkyl group, a hydroxy group or a fluorine atom, and still more preferably a methyl group, a hydroxy group, or a fluorine atom.

Examples of the ring structure having 4 to 20 ring atoms which may be constituted by at least two of the plurality of $R^8$s taken together include:

alicyclic structures such as a cyclopentane structure and a cyclohexane structure;

aromatic ring structures such as a benzene structure and a naphthalene structure; and the like.

Of these, the aromatic ring structure is preferred, and a benzene structure is more preferred.

p is preferably 0 to 2, more preferably 0 or 1, and still more preferably 0.

The structural unit (I-1) may be formed by, for example: polymerizing using an aromatic vinyl compound such as styrene, and a diene compound such as isoprene to form an aromatic vinyl-diene structural unit having an aromatic ring in its side chain and having a carbon-carbon double bond in its main chain; and permitting a cyclization reaction in the aromatic vinyl-diene structural unit to form a cyclohexane structure in the presence of an acid such as trifluoromethanesulfonic acid.

The lower limit of a proportion of the structural unit (I) with respect to total structural units constituting the polymer (A) is preferably 0.1 mol %, more preferably 1 mol %, still more preferably 5 mol %, and particularly preferably 10 mol %. The upper limit of the proportion is preferably 80 mol %, more preferably 50 mol %, still more preferably 40 mol %, and particularly preferably 30 mol %. When the proportion of the structural unit (I) falls within the above range, heat resistance of the film can be further improved.

Structural Unit (II)

The structural unit (II) is a structural unit other than the structural unit (I). The structural unit (II) is exemplified by: a structural unit derived from substituted or unsubstituted styrene; a structural unit derived from (meth)acrylic acid or a (meth)acrylic acid ester; a structural unit derived from substituted or unsubstituted ethylene; a structural unit which includes a crosslinkable group; and the like. The polymer (A) may have one, or two or more types of each of these structural units. The "crosslinkable group" as referred to herein means a group capable of forming a cross-linked structure through a reaction under heating conditions, under conditions involving radiation with an active energy ray, under acidic conditions, or the like.

Examples of a monomer that gives the structural unit derived from substituted or unsubstituted styrene include styrene, α-methylstyrene, o-methylstyrene, m-methylstyrene, p-methylstyrene, p-t-butylstyrene, 2,4,6-trimethylstyrene, p-methoxystyrene, p-t-butoxystyrene, o-vinylstyrene, m-vinylstyrene, p-vinylstyrene, o-hydroxystyrene, m-hydroxystyrene, p-hydroxystyrene, m-chloromethylstyrene, p-chloromethylstyrene, p-chlorostyrene, p-bromostyrene, p-iodostyrene, p-nitrostyrene, p-cyanostyrene, and the like.

Examples of a monomer that gives the structural unit derived from a (meth)acrylic acid ester include:

(meth)acrylic acid alkyl esters such as methyl (meth)acrylate, ethyl (meth)acrylate, t-butyl (meth)acrylate, and 2-ethylhexyl (meth)acrylate;

(meth)acrylic acid cycloalkyl esters such as cyclopentyl (meth)acrylate, cyclohexyl (meth)acrylate, 1-methylcyclopentyl (meth)acrylate, 2-ethyladamantyl (meth)acrylate, and 2-(adamantan-1-yl)propyl (meth)acrylate;

(meth)acrylic acid aryl esters such as phenyl (meth)acrylate and naphthyl (meth)acrylate;

(meth)acrylic acid-substituted alkyl esters such as 2-hydroxyethyl (meth)acrylate, 3-hydroxyadamantyl (meth)acrylate, 3-glycidylpropyl (meth)acrylate, and 3-trimethylsilylpropyl (meth)acrylate; and the like.

Examples of a monomer that gives the structural unit derived from substituted or unsubstituted ethylene include:

ethylene;

alkenes such as propene, butene, and pentene;

vinylcycloalkanes such as vinylcyclopentane and vinylcyclohexane;

cycloalkenes such as cyclopentene and cyclohexene;

4-hydroxy-1-butene; vinyl glycidyl ether; vinyl trimethyl silyl ether; and the like.

Examples of the crosslinkable group include:

polymerizable carbon-carbon double bond-containing groups such as a vinyl group, a vinyloxy group, an allyl group, a (meth)acryloyl group, and a styryl group;

cyclic ether groups such as an oxiranyl group, an oxiranyloxy group, an oxetanyl group, and an oxetanyloxy group;

cyclobutane ring-fused aryl groups such as a cyclobutane ring-fused phenyl group, and a cyclobutane ring-fused naphthyl group;

aryl groups bonded to an aromatic hydroxy group protected with an acyl group or a heat-labile group, such as an acetoxyphenyl group and a t-butoxyphenyl group;

aryl groups bonded to a methylol group (—CH$_2$OH) protected with an acyl group or a heat-labile group, such as an acetoxymethylphenyl group and a methoxymethylphenyl group;

aryl groups bonded to a substituted or unsubstituted sulfanylmethyl group (—CH$_2$SH), such as a sulfanylmethylphenyl group and a methylsulfanylmethylphenyl group; and the like.

The cyclobutane ring-fused aryl groups form a covalent bond with one another under heating conditions.

The "acyl group" as referred to herein is a group obtained by removing OH from a carboxylic acid, and means a group that protects an aromatic hydroxy group or a methylol group by substituting for a hydrogen atom. The "heat-labile group" as referred to herein is a group that substitutes for a hydrogen atom of an aromatic hydroxy group, a methylol group, or a sulfanylmethyl group, and means a group that dissociates by heating.

Examples of the acyl group in the aryl group bonded to an aromatic hydroxy group, a methylol group or a sulfanylmethyl group, each being protected, include a formyl group, an acetyl group, a propionyl group, a butyryl group, a benzoyl group, and the like.

Examples of the heat-labile group in the aryl group bonded to a protected aromatic hydroxy group include tertiary alkyl groups such as a t-butyl group and a t-amyl group, and the like. Examples of the heat-labile group in the aryl group bonded to a protected methylol group or sulfanylmethyl group include alkyl groups such as a methyl group, an ethyl group and a propyl group, and the like.

Examples of the structural unit that includes the crosslinkable group include a structural unit derived from a vinyl compound having a crosslinkable group, a structural unit derived from a (meth)acryl compound having a crosslinkable group, and the like.

In the case of the polymer (A) having the structural unit (II), the lower limit of a proportion of the structural unit (II) with respect to total structural units constituting the polymer (A) is preferably 20 mol %, more preferably 50 mol %, still more preferably 60 mol %, and particularly preferably 70 mol %. The upper limit of the proportion is preferably 99.9 mol %, more preferably 99 mol %, still more preferably 95 mol %, and particularly preferably 90 mol %.

Functional Group (X)

The functional group (X) is a functional group capable of bonding to the metal atom (M). This bond is exemplified by chemical bonds, and examples thereof include a covalent bond, an ionic bond, a coordinate bond, and the like. Of these, in light of greater bonding strength between the metal atom (M) and the functional group (X), the coordinate bond is preferred.

Examples of the functional group (X) include a cyano group, a phosphono group (—P(=O)(OH)$_2$), a dihydroxyboryl group (—B(OH)$_2$), a hydroxy group, a sulfanyl group (—SH), a sulfo group (—SO$_3$H), halogen atoms such as a fluorine atom, a chlorine atom, a bromine atom, and an iodine atom, and the like. Of these, in light of enhanced regional selectivity of the chemical modification, a cyano group, a phosphono group, or a hydroxyboryl group is preferred.

The polymer (A) has, for example, a group (hereinafter, may be also referred to as "group (I)") which includes the functional group (X) at an end of the main chain or at an end of the side chain. The "side chain" as referred to herein means an atom chain of the polymer (A) other than the main chain.

Examples of the group (I) include *—X, *—Y—X (wherein X represents a functional group (X); Y represents an alkanediyl group having 1 to 20 carbon atoms; and * denotes a site capable of bonding to the end of the polymer (A)), and the like. Y represents preferably a methanediyl group, an ethanediyl group, or a propanediyl group.

The group (I) at the end of the main chain can be introduced by, for example, treating a polymerization end of living anionic polymerization or the like, with an end treatment agent that gives the group (I).

Examples of the end treatment agent that gives the group (I) include 3-bromopropionitrile, a chlorophosphoric acid diethyl ester, diisopropyl bromomethyl borate, diethyl bromomethyl borate, and the like. The phosphono group as the functional group (X) can be formed by hydrolyzing, in the presence of, e.g., a base such as triethylamine, a group formed by using a chlorophosphoric acid diethyl ester in a solvent such as propylene glycol monomethyl ether. The dihydroxyboryl group as the functional group (X) can be formed by hydrolyzing, in the presence of a base such as triethylamine, a group formed by using, for example, diisopropyl bromomethyl borate or diethyl bromomethyl borate in a solvent such as propylene glycol monomethyl ether.

The polymer (A) having the group (I) at the end of the side chain can be formed by, for example, using as a monomer that gives the structural unit (II), a monomer having the functional group (X) at the end and also having an ethylenic carbon-carbon double bond.

Examples of monomer having the functional group (X) at the end and also having an ethylenic carbon-carbon double bond include p-cyanostyrene, 4-cyanomethylstyrene, vinylphosphoric acid, and the like.

In light of further improvement of the regional selectivity of the chemical modification, the polymer (A) preferably has the group (I) at the end of the main chain, and more preferably has the group (I) at one end of the main chain.

The lower limit of a polystyrene equivalent weight average molecular weight (Mw) of the polymer (A) as determined by gel permeation chromatography (GPC) is preferably 1,000, more preferably 2,000, still more preferably 4,000, and particularly preferably 4,500. The upper limit of the Mw is preferably 50,000, more preferably 30,000, still more preferably 15,000, and particularly preferably 8,000.

The upper limit of a ratio (Mw/Mn, dispersity index) of the Mw to a polystyrene equivalent number average molecular weight (Mn) as determined by GPC of the polymer (A) is preferably 5, more preferably 2, still more preferably 1.5, and particularly preferably 1.3. The lower limit of the ratio is typically 1, and preferably 1.05.

The Mw and Mn of the polymer as referred to herein are values each measured by gel permeation chromatography under the following conditions using GPC columns ("G2000 HXL"×2, "G3000 HXL"×1, and "G4000 HXL"×1) available from Tosoh Corporation.

eluent: tetrahydrofuran (FUJIFILM Wako Pure Chemical Corporation)
flow rate: 1.0 mL/min
sample concentration: 1.0% by mass
amount of injected sample: 100 μL
column temperature: 40° C.
detector: differential refractometer
standard substance: mono-dispersed polystyrene The lower limit of a proportion of the polymer (A) with respect to total components other than the solvent (B) in the composition is preferably 80% by mass, more preferably 90% by mass, and still more preferably 95% by mass. The upper limit of the proportion is, for example, 100% by mass.

Synthesis Method of Polymer (A)

The polymer (A) having the structural unit (I-1) and having the group (I) at the end of the main chain may be synthesized by, for example: first conducting living anionic polymerization of an aromatic vinyl compound such as styrene, and a diene compound such as isoprene, and as needed, another monomer, using an initiator such as sec-butyllithium in a solvent such as tetrahydrofuran (THF); subjecting its polymerization end to a treatment with the end treatment agent that gives the group (I) to give a polymer having an aromatic vinyl-diene structural unit and having the group (I) at the end of the main chain; and then permitting a cyclization reaction of the resultant polymer in the presence of an acid such as trifluoromethanesulfonic acid in a solvent such as cyclohexane to form the structural unit (I-1). In the case in which the functional group (X) is a phosphono group, the phosphono group can be provided by: using as the end treatment agent, a compound having an esterified phosphono group such as a chlorophosphoric acid diethyl ester to give the polymer having the esterified phosphono group at the end of the main chain; and permitting a hydrolysis reaction of the resultant polymer in the presence of a base such as triethylamine, in a solvent such as propylene glycol monomethyl ether.

The polymer (A) having the structural unit (I-1) and having the functional group (X) at the end of the side chain may be synthesized by, for example: first allowing for polymerization such as radical polymerization or anion polymerization of: an aromatic vinyl compound such as styrene; a diene compound such as isoprene; a monomer having the functional group (X) at the end and also having an ethylenic carbon-carbon double bond, such as p-cyanostyrene; and as needed, another monomer to give a polymer having an aromatic vinyl-diene structural unit and having the functional group (X) at the end of the side chain; and then permitting a cyclization reaction of the resultant polymer in the presence of an acid such as trifluoromethanesulfonic acid, in a solvent such as cyclohexane to form the structural unit (I-1).

The polymer (A) other than those described above can be also synthesized in a similar manner by a well-known method.

(B) Solvent

The solvent (B) is not particularly limited as long as it is a solvent capable of dissolving or dispersing at least the polymer (A) and the other component(s).

The solvent (B) is exemplified by alcohol solvents, ether solvents, ketone solvents, amide solvents, ester solvents, hydrocarbon solvents, and the like.

Examples of the alcohol solvents include:
aliphatic monohydric alcohol solvents having 1 to 18 carbon atoms such as 4-methyl-2-pentanol and n-hexanol;
alicyclic monohydric alcohol solvents having 3 to 18 carbon atoms such as cyclohexanol;
polyhydric alcohol solvents having 2 to 18 carbon atoms such as 1,2-propylene glycol;
polyhydric alcohol partially ether solvents having 3 to 19 carbon atoms such as propylene glycol monomethyl ether; and the like.

Examples of the ether solvents include:
dialkyl ether solvents such as diethyl ether, dipropyl ether, dibutyl ether, dipentyl ether, diisoamyl ether, dihexyl ether and diheptyl ether;
cyclic ether solvents such as tetrahydrofuran and tetrahydropyran;
aromatic ring-containing ether solvents such as diphenyl ether and anisole (methyl phenyl ether); and the like.

Examples of the ketone solvents include:
chain ketone solvents such as acetone, methyl ethyl ketone, methyl n-propyl ketone, methyl n-butyl ketone, diethyl ketone, methyl iso-butyl ketone (MIBK), 2-heptanone (methyl-n-pentyl ketone), ethyl n-butyl ketone, methyl n-hexyl ketone, di-iso-butyl ketone, and trimethylnonanone;
cyclic ketone solvents such as cyclopentanone, cyclohexanone, cycloheptanone, cyclooctanone, and methylcyclohexanone;
2,4-pentanedione, acetonylacetone, and acetophenone; and the like.

Examples of the amide solvents include:
cyclic amide solvents such as N,N'-dimethylimidazolidinone and N-methylpyrrolidone;
chain amide solvents such as N-methylformamide, N,N-dimethylformamide, N,N-diethylformamide, acetamide, N-methylacetamide, N,N-dimethylacetamide and N-methylpropionamide; and the like.

Examples of the ester solvents include:
monocarboxylic acid ester solvents such as n-butyl acetate and ethyl lactate;
polyhydric alcohol carboxylate solvents such as propylene glycol acetate;
polyhydric alcohol partially ether carboxylate solvents such as propylene glycol monomethyl ether acetate;
lactone solvents such as γ-butyrolactone and δ-valerolactone;
polyhydric carboxylic acid diester solvents such as diethyl oxalate;
carbonate solvents such as dimethyl carbonate, diethyl carbonate, ethylene carbonate, and propylene carbonate; and the like.

Examples of the hydrocarbon solvents include:
aliphatic hydrocarbon solvents having 5 to 12 carbon atoms such as n-pentane and n-hexane;
aromatic hydrocarbon solvents having 6 to 16 carbon atoms such as toluene and xylene; and the like.

Of these, the ester solvents are preferred, the polyhydric alcohol partially ether carboxylate solvents are more preferred, and propylene glycol monomethyl ether acetate is still more preferred. The composition of the one embodiment of the present invention may contain one, or two or more types of the solvent (B).

Optional Component(s)

The composition may contain as optional component(s), an acid generating agent, a surfactant, and/or the like.

Acid Generating Agent

The acid generating agent is a compound that is capable of generating an acid by heating or irradiation with an active energy ray. The acid generating agent is exemplified by ionic compounds, nonionic compounds, and the like.

Examples of ionic acid generating agents include salts of:
a cation such as triphenyl sulfonium, 1-dimethylthionaphthalene, 1-dimethylthio-4-hydroxynaphthalene, 1-dimethylthio-4,7-dihydroxynaphthalene, 4-hydroxyphenyldimethyl sulfonium, benzyl-4-hydroxyphenylmethyl sulfonium, 2-methylbenzyl-4-hydroxyphenylmethyl sulfonium, 2-methylbenzyl-4-acetylphenylmethyl sulfonium, 2-methylbenzyl-4-benzoyloxyphenylmethyl sulfonium, 1-(4-n-butoxynaphthalen-1-yl) tetrahydrothiophenium, 1-(4,7-dibutoxy-1-naphthalenyl) tetrahydrothiophenium, diphenyl iodonium or di(t-butylphenyl) iodonium; with an anion e.g., a sulfonate ion which may be methanesulfonate, trifluoromethanesulfonate, a fluorinated alkyl sulfonate such as nonafluorobutanesulfonate, camphorsulfonate, a p-toluenesulfonic acid ion or the like; or a phosphoric acid ion such as a hexafluorophosphoric acid ion, a boric acid ion such as a tetrafluoroboric acid ion, an antimonic acid ion such as a hexafluoroantimonic acid ion, or the like. Of these, the salts of the triphenylsulfonium cation with the fluorinated alkyl sulfonate ion are preferred, and triphenylsulfonium nonafluorobutane-1-sulfonate is more preferred.

Nonionic acid generating agents are exemplified by halogen-containing compounds, diazomethane compounds, sulfone compounds, sulfonic acid ester compounds, carboxylic acid ester compounds, phosphoric acid ester compounds, N-sulfonyloxyimide compounds, sulfonebenzotriazole compounds, and the like.

Examples of the N-sulfonyloxyimide compounds include N-(trifluoromethylsulfonyloxy)succinimide, N-(2-trifluoromethylphenylsulfonyloxy)phthalimide, and the like.

In the case of the composition containing the acid generating agent, the lower limit of a content of the heat acid generating agent with respect to 100 parts by mass of the polymer (A) is preferably 0.1 parts by mass, more preferably 0.5 parts by mass, still more preferably 1 part by mass, and particularly preferably 2 parts by mass. The upper limit of the content is preferably 50 parts by mass, more preferably 30 parts by mass, still more preferably 10 parts by mass, and particularly preferably 6 parts by mass.

Preparation Method of Composition

The composition of the one embodiment of the present invention may be prepared by, for example, mixing the polymer (A), the solvent (B), and as needed the optional component(s) at a predetermined ratio, and preferably filtering the resulting mixture through a high-density polyethylene filter, etc., having fine pores of about 0.45 μm. The lower limit of the solid content concentration of the composition is preferably 0.1% by mass, more preferably 0.5% by mass, and still more preferably 0.7% by mass. The upper limit of the solid content concentration is preferably 30% by mass, more preferably 10% by mass, and still more preferably 3% by mass. The "solid content concentration" as referred to herein means the concentration (% by mass) of the total components other than the solvent (B) in the composition.

Method of Producing Substrate

The method of producing a substrate of another embodiment of the present invention includes steps of: applying a composition directly or indirectly on a base containing a metal atom in a surface layer thereof (hereinafter, may be also referred to as "applying step"); and heating a coating film formed by the applying step (hereinafter, may be also referred to as "heating step"). In the method of producing a substrate, the composition of the one embodiment of the present invention described above is used as the composition.

Due to the composition being used, the method of producing a substrate enable regionally selective forming of a film which is superior in heat resistance and is wet detachable, on a surface of a base containing a metal atom in a surface layer thereof, the film being capable of achieving superior blocking performance against metal oxide formation by an ALD process or a CVD process.

The method of producing a substrate may include after the heating step, a step of removing with a rinse agent, a portion formed on the region (II) of the coating film after the heating step (hereinafter, may be also referred to as "rinsing step").

The method of producing a substrate may include after the rinsing step, a step of depositing a pattern on the surface of the base (S) after the rinsing step, by a CVD process or an ALD process (hereinafter, may be also referred to as "depositing step").

In addition, the method of producing a substrate may include after the heating step, a step of bringing a removing liquid into contact with a film formed by the heating step (hereinafter, may be also referred to as "removing step"). Accordingly, wet detachment of the film formed is enabled.

Each step will be described below.

Applying Step

In this step, the composition of the embodiment of the present invention is directly or indirectly applied on the base (S) containing a metal atom in a surface layer thereof. Accordingly, a coating film is formed on the base (S) directly or via other layer.

It is preferred that the base (S) has the region (I) containing the metal atom (M) in the surface layer thereof and the region (II) not containing the metal atom (M) in the surface layer thereof. In the case of the base (S) having both the region (I) and the region (II), selective chemical modification of the surface of the region (I) containing the metal atom (M) in the surface layer thereof is enabled.

It is preferred that the metal atom (M) in the surface layer of the base (S) constitutes a metal simple substance, an alloy, an electrically conductive nitride, or a silicide. Moreover, the metal atom (M) is preferably an atom of copper, iron, zinc, cobalt, aluminum, titanium, tin, tungsten, zirconium, tantalum, germanium, molybdenum, ruthenium, gold, silver, platinum, palladium, or nickel.

The application procedure of the composition is exemplified by a spin coating process, and the like.

Heating Step

In this step, a coating film formed by the applying step is heated. Accordingly, formation of a bond between the metal atom (M) in the surface layer of the base (S) and the functional group (X) of the polymer (A) in the composition is accelerated Means for the heating may be, for example, an oven, a hot plate, or the like. The lower limit of the temperature of the heating is preferably 80° C., more preferably 100° C., and still more preferably 130° C. The upper limit of the temperature of the heating is preferably 400° C., more preferably 300° C., and still more preferably 200° C. The lower limit of the time period of the heating is preferably 10 sec, more preferably 1 min, and still more preferably 2 min. The upper limit of the time period of the heating is preferably 120 min, more preferably 10 min, and still more preferably 5 min.

An average thickness of the film to be formed may be adjusted to a desired value by appropriately selecting the type and concentration of the polymer (A) in the composition, and conditions in the heating step such as the heating temperature and the heating time period. The lower limit of the average thickness of the film is preferably 0.1 nm, more preferably 1 nm, and still more preferably 3 nm. The upper limit of the average thickness is, for example, 20 nm.

Rinsing Step

In this step, a portion formed on the region (II) of the coating film after the heating step is removed with a rinse agent. Accordingly, a portion, which includes the polymer (A) not being bonded to the metal atom (M), of the coating film after the heating step is removed, whereby the base (S) having a portion of the region (I) being chemically modified in a selective manner is obtained.

The rinse agent used is typically an organic solvent, and for example, a polyhydric alcohol partially ether carboxylate solvent such as propylene glycol monomethyl ether acetate, a monohydric alcohol solvent such as isopropanol, or the like may be used.

In the aforementioned manner, a film superior in heat resistance can be selectively formed on the region (I) containing the metal atom (M) in the surface layer of the base (S). The base thus obtained may be processed by carrying out, for example, the following depositing step.

Depositing Step

In this step, a pattern is deposited on the surface of the base (S) after the rinsing step by the CVD process or ALD process. Accordingly, a metal oxide pattern can be formed selectively on the region (II) not chemically modified by the polymer (A). According to the method of producing a substrate, by forming the film superior in heat resistance by using the composition described above, ALD tolerance can be further enhanced, and as a result, the metal oxide pattern can be formed on the region (II) in a further regionally selective manner.

Removing Step

In this step, a removing liquid is brought into contact with the film formed by the heating step. Accordingly, the film formed can be remover by wet detachment, in a convenient manner with influences on the base (S) being diminished.

The removing liquid is preferably a liquid containing an acid. Examples of the acid include: inorganic acids such as hydrochloric acid, sulfuric acid, nitric acid, and hydrofluoric acid; carboxylic acids such as acetic acid, citric acid, oxalic acid, maleic acid, isobutyric acid, and 2-ethylhexanoic acid, and the like. Of these, carboxylic acids are preferred, and acetic acid or citric acid is more preferred. Furthermore, the removing liquid is also exemplified by an aqueous ammonia hydrogen-peroxide solution, an aqueous hydrochloric acid-hydrogen peroxide solution, and the like.

The solvent of the removing liquid preferably contains water as a principal component. The lower limit of a proportion of water in the solvent is preferably 50% by mass, more preferably 90% by mass, and still more preferably 99% by mass. The proportion may be 100% by mass.

The lower limit of a concentration of the acid in the liquid containing the acid is preferably 0.1% by mass, more preferably 1% by mass, and still more preferably 3% by mass. The upper limit of the concentration is, for example, 100% by mass, more preferably 90% by mass, and still more preferably 50% by mass.

Polymer

The polymer of the still another embodiment of the present invention is a polymer having a structural unit (structural unit (I)) which includes a ring structure, wherein an atom chain constituting the ring structure constitutes a part of a main chain of the polymer, and the polymer has at an end of the main chain or at an end of a side chain, a cyano group, a phosphono group or a dihydroxyboryl group (functional group (X')).

The polymer enables, through use as the component in the composition of the one embodiment of the present invention as described above, regionally selective forming of a film which is superior in heat resistance and is wet detachable, on a surface of a base containing a metal atom in a surface layer thereof, the film being capable of achieving superior blocking performance against metal oxide formation by an ALD process or a CVD process.

The polymer is described as the polymer (A) in the composition described above.

EXAMPLES

Hereinafter, the present invention is explained in detail by way of Examples, but the present invention is not in any way limited to these Examples. Measuring methods for physical property values are each shown below.

Mw and Mn

The Mw and the Mn of the polymer were determined by gel permeation chromatography (GPC) using GPC columns (Tosoh Corporation; "G2000 HXL"×2, "G3000 HXL"×1 and "G4000 HXL"×1) under the following conditions:
  eluent: tetrahydrofuran (Wako Pure Chemical Industries, Ltd.);
  flow rate: 1.0 mL/min;
  sample concentration: 1.0% by mass;
  amount of sample injected: 100 μL;
  column temperature: 40° C.;
  detector: differential refractometer; and
  standard substance: mono-dispersed polystyrene.

$^{13}$C-NMR Analysis

A $^{13}$C-NMR analysis was performed using a nuclear magnetic resonance apparatus ("JNM-EX400" available from JEOL, Ltd.), with CDCl$_3$ used as a solvent for measurement. The proportion of each structural unit contained in the polymer was calculated from an area ratio of a peak corresponding to each structural unit on the spectrum obtained by the $^{13}$C-NMR.

Synthesis of Polymer (A)

Synthesis Example 1: Synthesis of Polymer (A-1) (PS-ω-CN)

After a 500-mL flask as a reaction vessel was dried under reduced pressure, 120 g of tetrahydrofuran (THF) which had been subjected to a dehydrating treatment by distillation in a nitrogen atmosphere was charged thereinto and cooled to −78° C. Next, 2.38 mL of a 1 N cyclohexane solution of sec-butyllithium (sec-BuLi) was charged into this THF, and then 13.3 mL of styrene, which had been subjected to adsorptive filtration through silica gel for removing a polymerization inhibitor and to a dehydrating treatment by distillation, was charged by dropwise addition over 30 min, and the color of the polymerization system was ascertained to be orange. During the charging by dropwise addition, the internal temperature of the reaction mixture was carefully controlled so as not to be −60° C. or greater. After completion of the dropwise addition, the mixture was stirred for 30 min. Thereafter, 0.19 mL of 3-bromopropionitrile was charged to conduct a terminating reaction of the polymerization end. The temperature of the reaction mixture was elevated to room temperature, and a resulting reaction mixture solution was concentrated and then substitution with methyl isobutyl ketone (MIBK) was allowed. To a solution thus obtained, 1,000 g of a 2% by mass aqueous oxalic acid solution was charged, a resultant mixture was stirred and left to stand still, and then an aqueous underlayer was removed. This operation was repeated three times to remove a metal salt. Thereafter, 1,000 g of ultrapure water was charged, a resultant mixture was stirred, and then an aqueous underlayer was removed. After this operation was repeated three times to remove oxalic acid, a solution thus obtained was concentrated and then dropped into 500 g of methanol to precipitate a polymer, and a solid was collected on a Buchner funnel. The solid was dried at 60° C. under reduced pressure, whereby 11.9 g of a white polymer represented by the following formula (A-1) was obtained. The polymer (A-1) had an Mw of 5,600, an Mn of 5,200, and an Mw/Mn of 1.08.

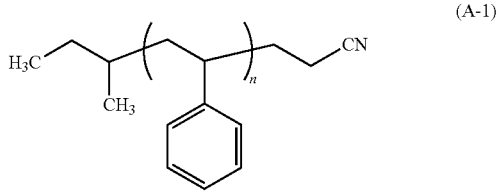

(A-1)

Synthesis Example 2: Synthesis of Polymer (A-2) (PS-r-PIP-ω-CN)

After a 500-mL flask as a reaction vessel was dried under reduced pressure, 120 g of THF which had been subjected to a dehydrating treatment by distillation in a nitrogen atmosphere was charged thereinto and cooled to −78° C. Next, 2.90 mL of a 1 N cyclohexane solution of sec-butyllithium (sec-BuLi) was charged into this THF, and then 2.90 mL of isoprene, and 13.3 mL of styrene, which had been subjected to adsorptive filtration through silica gel for removing a polymerization inhibitor and to a dehydrating treatment by distillation, was charged by dropwise addition over 30 min, and the color of the polymerization system was ascertained to gradually change from orange to yellow. During the charging by dropwise addition, the internal temperature of the reaction mixture was carefully controlled so as not to be −60° C. or greater. After completion of the dropwise addition, the mixture was stirred for 30 min. Thereafter, 0.48 mL of 3-bromopropionitrile was charged to conduct a terminating reaction of the polymerization end. The temperature of the reaction mixture was elevated to room temperature, and a resulting reaction mixture solution was concentrated and then substitution with MIBK was allowed. To a solution thus obtained, 1,000 g of a 2% by mass aqueous oxalic acid solution was charged, a resultant mixture was stirred and left to stand still, and then an aqueous underlayer was removed. This operation was repeated three times to remove a Li salt. Thereafter, 1,000 g of ultrapure water was charged, a resultant mixture was stirred, and then an aqueous underlayer was removed. After this operation was repeated three times to remove oxalic acid, a solution thus obtained was concentrated and then dropped into 500 g of methanol to precipitate a polymer, and a solid was collected on a Buchner funnel. The solid was dried at 60° C. under reduced pressure, whereby 13.3 g of a white polymer represented by the following formula (A-2) was obtained. The polymer (A-2) had an Mw of 5,200, an Mn of 4,800, and an Mw/Mn of 1.08.

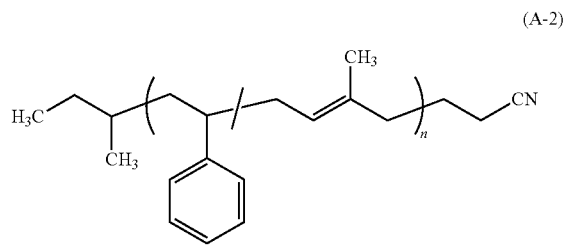

(A-2)

Synthesis Example 3: Synthesis of Polymer (A-3) (PS-r-Cycle-ω-CN)

The polymer (A-2) synthesized as above in an amount of 13.3 g was dissolved in 130 g of cyclohexane, and thereto was added 0.13 g of trifluoromethanesulfonic acid. The mixture was stirred at a normal temperature for 1 hour to conduct a cyclization reaction. After completion of the cyclization reaction, an operation of adding 100 g of ultrapure water to remove trifluoromethanesulfonic acid was carried out four times and the organic layer was concentrated. Then the polymer was precipitated by adding a resultant concentrate into 500 g of methanol dropwise to give 13.1 g of a polymer represented by the following formula (A-3). The polymer (A-3) was a polymer with a cyclized main chain, and occurrence of the cyclization reaction was ascertained by disappearance of a peak of unsaturated olefin derived from isoprene at around 4.0-4.5 ppm in a $^1$H-NMR spectrum.

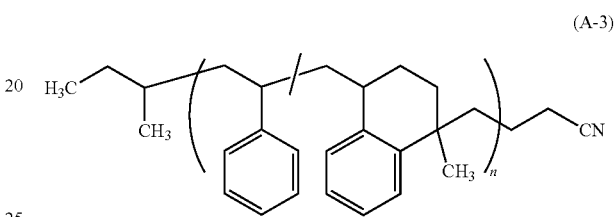

(A-3)

Synthesis Example 4: Synthesis of Polymer (A-4) (PS-r-IP-ω-PO3H2))

After a 500-mL flask as a reaction vessel was dried under reduced pressure, 120 g of THF which had been subjected to a dehydrating treatment by distillation in a nitrogen atmosphere was charged thereinto and cooled to −78° C. Next, 2.56 mL of a 1 N cyclohexane solution of sec-butyllithium (sec-BuLi) was charged into this THF, and then 3.20 mL of isoprene, and 11.1 mL of styrene, which had been subjected to adsorptive filtration through silica gel for removing a polymerization inhibitor and to a dehydrating treatment by distillation, was charged by dropwise addition over 30 min, and the color of the polymerization system was ascertained to gradually change from orange to yellow. During the charging by dropwise addition, the internal temperature of the reaction mixture was carefully controlled so as not to be −60° C. or greater. After completion of the dropwise addition, the mixture was stirred for 30 min. Thereafter, 0.37 mL of chlorophosphoric acid diethyl ester was charged to conduct a terminating reaction of the polymerization end. The temperature of the reaction mixture was elevated to room temperature, and a resulting reaction mixture solution was concentrated and then substitution with MIBK was allowed. To a solution thus obtained, 1,000 g of a 2% by mass aqueous oxalic acid solution was charged, a resultant mixture was stirred and left to stand still, and then an aqueous underlayer was removed. This operation was repeated three times to remove a Li salt. Thereafter, 1,000 g of ultrapure water was charged, a resultant mixture was stirred, and then an aqueous underlayer was removed. After this operation was repeated three times to remove oxalic acid, a solution thus obtained was concentrated and then dropped into 500 g of methanol to precipitate a polymer, and a solid was collected on a Buchner funnel. The solid was dried at 60° C. under reduced pressure, whereby a white polymer having a phosphoric acid diethyl end was obtained.

Next, 0.63 g of triethylamine and 2 g of propylene glycol monomethyl ether were added to the polymer thus obtained, and the mixture was heated with stirring at 80° C. for 3 hrs to conduct a hydrolysis reaction. The polymer was precipitated by adding a solution of the resulting polymer into 500 g of methanol dropwise to give 13.1 g of a polymer represented by the following formula (A-4).

The polymer (A-4) had an Mw of 5,100, an Mn of 4,800, and an Mw/Mn of 1.06.

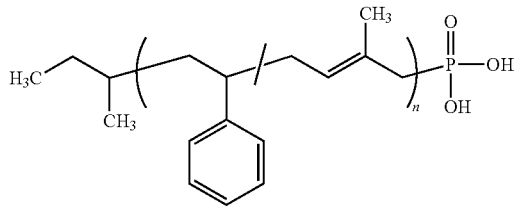

(A-4)

Synthesis Example 5: Synthesis of Polymer (A-5) (PS-r-cycle-ω-PO3H2)

The polymer before the hydrolysis of the polymer (A-4) described above, in an amount of 13.1 g, was dissolved in 130 g of cyclohexane, and thereto was added 0.13 g of trifluoromethanesulfonic acid. The mixture was stirred at a normal temperature for 1 hour to conduct a cyclization reaction. After completion of the cyclization reaction, an operation of adding 100 g of ultrapure water to remove trifluoromethanesulfonic acid was carried out four times and the organic layer was concentrated. Then the polymer was precipitated by adding a concentrate into 500 g of methanol dropwise to give 11.6 g of the polymer having a phosphoric acid diethyl end. The polymer was a polymer with a cyclized main chain, and occurrence of the cyclization reaction was ascertained by disappearance of a peak of unsaturated olefin derived from isoprene at around 4.0-4.5 ppm in a $^1$H-NMR spectrum.

Next, 0.63 g of triethylamine and 2 g of propylene glycol monomethyl ether were added to the polymer thus obtained, and the mixture was heated with stirring at 80° C. for 3 hrs to conduct a hydrolysis reaction. The polymer was precipitated by adding a solution of the resulting polymer into 500 g of methanol dropwise to give 10.8 g of a polymer represented by the following formula (A-5).

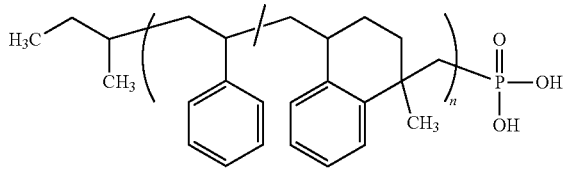

(A-5)

Evaluation of Heat Resistance

With regard to polymers synthesized as described above, thermal decomposition temperatures were measured, whereby heat resistance was evaluated. Measurement of the thermal decomposition temperature was carried out by heating in a nitrogen atmosphere (200 mL/min) at a rate of temperature rise of 10° C./10 min from 30° C. to 500° C., using "TG/DTA7300" available from Seiko Instruments Inc., and a 3% by mass weight reduction temperature (Td3) was determined.

Measurement values of Td3 were 380° C. for the polymer (A-1), 365° C. for the polymer (A-2), and 400° C. for the polymer (A-3).

Preparation of Composition

The solvent (B) and the acid generating agent (C) used in preparing the compositions are shown below.

(B) Solvent

B-1: propylene glycol monomethyl ether acetate (PGMEA)

(C) Acid Generating Agent

C-1: diphenyliodonium nonafluorobutanesulfonate

Comparative Example 1

The composition (S-1) was prepared by: adding 98.7 g of (B-1) as the solvent (B) to 1.30 g of (A-1) as the polymer (A); stirring a resultant mixture; and then filtering a thus resulting solution through a high density polyethylene filter having fine pores of 0.45 μm.

Examples 1 and 2, and Comparative Examples 2 to 5

Compositions (S-2) to (S-7) were prepared in a similar manner to the Comparative Example 1 except that for each component, the type and the amount shown in Table 1 below were used.

TABLE 1

| Composition | | Blend amount (g) | | | | | | |
|---|---|---|---|---|---|---|---|---|
| | | Comparative Example 1 S-1 | Comparative Example 2 S-2 | Comparative Example 3 S-3 | Example 1 S-4 | Comparative Example 4 S-5 | Comparative Example 5 S-6 | Example 2 S-7 |
| (A) Polymer | A-1 | 1.30 | | | | | | |
| | A-2 | | 1.30 | 1.25 | | | | |
| | A-3 | | | | 1.30 | | | |
| | A-4 | | | | | 1.30 | 1.25 | |
| | A-5 | | | | | | | 1.30 |
| (B) Solvent | B-1 | 98.7 | 98.7 | 98.7 | 98.7 | 98.7 | 98.7 | 98.7 |
| (C) Acid generating agent | C-1 | | | 0.05 | | | 0.05 | |
| Solid content concentration (% by mass) | | 1.30 | 1.30 | 1.30 | 1.30 | 1.30 | 1.30 | 1.30 |

Forming of Film

Comparative Example 6

An 8-inch copper substrate was cut into pieces of 3 cm×3 cm, and the composition (S-1) prepared described above was spin-coated at 1,500 rpm for 20 sec by using a spin coater ("MS-B300" available from Mikasa Co., Ltd.) and thereafter baked at 150° C. for 180 sec. Next, an unadsorbed film was removed by using propylene glycol monomethyl ether acetate.

Comparative Examples 7 to 20 and Examples 3 to 8

Films were formed in a similar manner to Comparative Example 6 except that the substrates (copper substrate, cobalt substrate, tungsten substrate, Si oxide substrate) and the compositions shown in Table 3 below were used.
Evaluation of Regional Selectivity in Film Forming
Measurement of Contact Angle Value of Surface On the substrates onto which the aforementioned compositions had been each applied and baked, contact angle values of the surfaces were measured using a contact angle meter ("Drop master DM-501" available from Kyowa Interface Science Co., Ltd.). Measurements of the contact angle values are shown together in Table 3 below.
Evaluation of Wet Detachability of Film 8-inch substrates (copper substrate, cobalt substrate, tungsten substrate, Si oxide substrate) were cut into pieces of 3 cm×3 cm, and the compositions shown in Table 3 below were each spin-coated at 1,500 rpm for 20 sec by using a spin coater ("MS-B300" available from Mikasa Co., Ltd.) and thereafter baked at 150° C. for 180 sec. Next, an unadsorbed film was removed by using propylene glycol monomethyl ether acetate. Then contact angle values of the surfaces were measured using a contact angle meter ("Drop master DM-501" available from Kyowa Interface Science Co., Ltd.). After immersion for 3 min in a dish into which acetic acid had been poured, a mixed solution of propylene glycol monomethyl ether acetate/ethyl lactate (8/2 (mass ratio)) was used for rinsing, and the contact angle value of the surface of the substrate was measured using the contact angle meter. Decreased contact angle values are shown in Table 3 below. From the contact angle values being thus decreased, detachment of the film was confirmed.
Evaluation of Metal Oxide Blocking In order to evaluate a state of film forming on the surface of each substrate onto which the composition had been applied and baked as in the above "Film Forming" section, an evaluation of metal oxide blocking was made in which a degree of inhibition of oxide layer forming by ALD was measured.
Evaluation of ALD Tolerance An evaluation of metal oxide blocking was made by using Cambridge Nanotech FIJI at Stanford University, under conditions shown in Table 2 below. As a precursor, tetrakis (dimethylamino)hafnium was used, and water was used as a catalytic promoter. With 47 cycles being fixed as ALD cycles, the presence/absence of oxide layer forming was ascertained on the substrate onto which the composition had been applied and baked.

TABLE 2

| Parameter | Value |
|---|---|
| Film type | ALD $HfO_2$ |
| Chamber | Cambridge Nanotech FIJI |
| Stage temp. | 200° C. |
| Hf precursor | Tetrakis(dimethylamino)hafnium |
| Co-reactant | $H_2O$ |
| Recipe timing | 0.3 s Hf/15 s purge/0.06 s $H_2O$/23 s purge |
| # of cycles | 47 cycles |
| Thickness on Si | 5.4 nm or 2.8 nm (by ellipsometry) |
| Loading | Let stage cool for 15 mins before loading |
| Queue Time | <3 hours from pick-up |

Evaluation by XPS (X-Ray Photoelectron Spectroscopy)

With regard to a Hf component on the coating film after the evaluation of ALD tolerance, quantitative determination was performed by an ESCA (Electron Spectroscopy for Chemical Analysis). According to the ESCA, with "Quantum 2000" available from ULVAC, Inc., the Hf component, derived by eliminating coating film components and substrate components from 100 μmφ any conditions, was quantitatively determined for Hf4f, and then a percentage was calculated. In this respect, a greater "ALD tolerance" value indicates the film having a superior Hf blocking performance.

TABLE 3

| | | | Selectivity | | Wet | ALD |
| | Composition | Sample | Copper | Si oxide | detachability | tolerance |
|---|---|---|---|---|---|---|
| | | Control | 71 | 36 | — | — |
| Comparative Example 6 | S-1 | PS-ω-CN | 88 | 41 | 39 | 72% |
| Comparative Example 7 | S-2 | PS-r-PIP-ω-CN | 88 | 38 | 38 | 56% |
| Comparative Example 8 | S-3 | PS-r-PIP-ω-CN/TAG | 89 | 40 | 40 | 77% |
| Comparative Example 9 | S-5 | PS-r-PIP-ω-PO3H2 | 90 | 40 | 38 | 58% |
| Comparative Example 10 | S-6 | PS-r-PIP-ω-PO3H2/TAG | 89 | 41 | 39 | 79% |
| Example 3 | S-4 | PS-r-Cycle-ω-CN | 94 | 39 | 38 | 92% |
| Example 4 | S-7 | PS-r-Cycle-ω-PO3H2 | 93 | 41 | 38 | 94% |

TABLE 3-continued

Cobalt substrate

| | Composition | Sample | Selectivity Cobalt | Selectivity Si oxide | Wet detachability | ALD tolerance |
|---|---|---|---|---|---|---|
| | | Control | 64 | 36 | — | — |
| Comparative Example 11 | S-1 | PS-ω-CN | 88 | 41 | 39 | 68% |
| Comparative Example 12 | S-2 | PS-r-PIP-ω-CN | 88 | 38 | 38 | 45% |
| Comparative Example 13 | S-3 | PS-r-PIP-ω-CN/TAG | 89 | 40 | 39 | 64% |
| Comparative Example 14 | S-5 | PS-r-PIP-ω-PO3H2 | 90 | 40 | 40 | 48% |
| Comparative Example 15 | S-6 | PS-r-PIP-ω-PO3H2/TAG | 89 | 41 | 40 | 67% |
| Example 5 | S-4 | PS-r-Cycle-ω-CN | 92 | 39 | 38 | 89% |
| Example 6 | S-7 | PS-r-Cycle-ω-PO3H2 | 91 | 41 | 39 | 92% |

Tungsten substrate

| | Composition | Sample | Selectivity Tungsten | Selectivity Si oxide | Wet detachability | ALD tolerance |
|---|---|---|---|---|---|---|
| | | Control | 63 | 36 | — | — |
| Comparative Example 16 | S-1 | PS-ω-CN | 89 | 40 | 39 | 71% |
| Comparative Example 17 | S-2 | PS-r-PIP-ω-CN | 88 | 38 | 41 | 51% |
| Comparative Example 18 | S-3 | PS-r-PIP-ω-CN/TAG | 88 | 40 | 38 | 69% |
| Comparative Example 19 | S-5 | PS-r-PIP-ω-PO3H2 | 86 | 40 | 38 | 49% |
| Comparative Example 20 | S-6 | PS-r-PIP-ω-PO3H2/TAG | 86 | 41 | 39 | 68% |
| Example 7 | S-4 | PS-r-Cycle-ω-CN | 91 | 40 | 38 | 91% |
| Example 8 | S-7 | PS-r-Cycle-ω-PO3H2 | 90 | 40 | 40 | 93% |

From the results shown in Table 3, it is revealed that the compositions of the Examples enable regionally selective forming of a film which is superior in heat resistance and is wet detachable, on a surface of a base containing a metal atom in a surface layer thereof, the film being capable of achieving superior blocking performance against metal oxide formation by an ALD process.

The composition and the method of producing a substrate of the embodiments of the present invention enable regionally selective forming of a film which is superior in heat resistance and is wet detachable, on a surface of a base containing a metal atom in a surface layer thereof, the film being capable of achieving superior blocking performance against metal oxide formation by an ALD process or a CVD process. The polymer of the still another embodiment of the present invention can be suitably used as a polymer component of the composition of the one embodiment of the present invention. Therefore, the composition, the method of producing a substrate, and the polymer of the embodiments of the present invention can be suitably used for working processes of semiconductor devices, and the like, in which microfabrication is expected to be further in progress hereafter.

Obviously, numerous modifications and variations of the present invention are possible in light of the above teachings. It is therefore to be understood that within the scope of the appended claims, the invention may be practiced otherwise than as specifically described herein.

What is claimed is:

1. A composition comprising:
a polymer comprising: a structural unit comprising a ring structure; and a functional group capable of bonding to a metal atom; and
a solvent,
wherein an atom chain constituting the ring structure constitutes a part of a main chain of the polymer, and
wherein the structural unit is represented by formula (1):

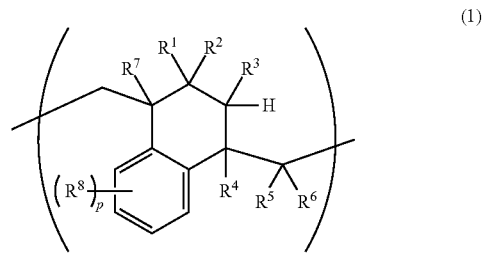

(1)

wherein, in the formula (1), $R^1$ to $R^6$ each independently represent a hydrogen atom, a halogen atom, or a monovalent organic group having 1 to 10 carbon atoms; $R^7$ represents a hydrogen atom or a monovalent organic group having 1 to 10 carbon atoms; and p is an integer of 0 to 4, wherein in a case in which p is 1, $R^8$ represents a halogen atom, a hydroxy group, or a monovalent organic group having 1 to 20 carbon atoms, and wherein in a case in which p is no less than 2, a plurality of $R^8$s are identical or different from each other and each represent a halogen atom, a hydroxy group, or a monovalent organic group having 1 to 20 carbon atoms, or at least two of the plurality of $R^8$s taken together represent a ring structure having 4 to 20 ring atoms together with the carbon chain to which the at least two of the plurality of $R^8$s bond.

2. The composition according to claim 1, wherein the polymer comprises at an end of the main chain or at an end of a side chain, a group comprising the functional group.

3. The composition according to claim 1, wherein the functional group is a cyano group, a phosphono group, or a dihydroxyboryl group.

4. The composition according to claim 1, wherein the composition is suitable for chemical modification of a surface of a base comprising the metal atom in a surface layer thereof.

5. A method of producing a substrate, the method comprising:
    forming a coating film directly or indirectly on a base comprising a metal atom in a surface layer thereof by applying the composition according to claim 1; and
    heating the coating film.

6. The method according to claim 5, wherein the base comprises:
    a first region comprising the metal atom in a surface layer thereof; and a second region not comprising the metal atom in a surface layer thereof.

7. The method according to claim 5, wherein the metal atom constitutes a metal simple substance, an alloy, an electrically conductive nitride, or a silicide.

8. The method according to claim 5, wherein the metal atom is an atom of copper, iron, zinc, cobalt, aluminum, titanium, tin, tungsten, zirconium, tantalum, germanium, molybdenum, ruthenium, gold, silver, platinum, palladium, or nickel.

9. The method according to claim 5, further comprising after the heating,
    bringing a removing liquid into contact with a film formed by the heating.

10. The method according to claim 9, wherein the removing liquid comprises an acid, a base, or both.

11. The method according to claim 5, wherein the polymer comprises at an end of the main chain or at an end of a side chain, a group comprising the functional group.

12. The method according to claim 5, wherein the functional group is a cyano group, a phosphono group, or a dihydroxyboryl group.

13. The composition according to claim 1, wherein a proportion of the structural unit with respect to total structural units constituting the polymer is 0.1 to 80 mol %.

14. The composition according to claim 1, wherein a proportion of the structural unit with respect to total structural units constituting the polymer is 10 to 30 mol %.

15. The composition according to claim 1, wherein a proportion of the polymer with respect to total components other than the solvent in the composition is 80% by mass or more.

16. The composition according to claim 1, wherein a proportion of the polymer with respect to total components other than the solvent in the composition is 95% by mass or more.

17. The method according to claim 5, wherein a proportion of the structural unit with respect to total structural units constituting the polymer is 0.1 to 80 mol %.

18. The method according to claim 5, wherein a proportion of the structural unit with respect to total structural units constituting the polymer is 10 to 30 mol %.

19. The method according to claim 5, wherein a proportion of the polymer with respect to total components other than the solvent in the composition is 80% by mass or more.

20. The method according to claim 5, wherein a proportion of the polymer with respect to total components other than the solvent in the composition is 95% by mass or more.

* * * * *